(12) United States Patent
Morris

(10) Patent No.: US 7,972,141 B2
(45) Date of Patent: *Jul. 5, 2011

(54) BLOOD PRESSURE SIMULATION APPARATUS WITH TACTILE FEEDBACK

(76) Inventor: Gary Jay Morris, Morgantown, WV (US)

( * ) Notice: Subject to any disclaimer, the term of this patent is extended or adjusted under 35 U.S.C. 154(b) by 839 days.

This patent is subject to a terminal disclaimer.

(21) Appl. No.: 12/009,480

(22) Filed: Jan. 18, 2008

(65) Prior Publication Data

US 2008/0118901 A1   May 22, 2008

Related U.S. Application Data

(63) Continuation-in-part of application No. 10/677,668, filed on Oct. 2, 2003, now Pat. No. 7,320,599.

(51) Int. Cl.
*G09B 23/28* (2006.01)
*A61B 5/02* (2006.01)

(52) U.S. Cl. ........ 434/268; 434/262; 434/265; 434/266; 434/267; 434/272; 434/275; 600/481; 600/485; 600/487; 600/488; 600/490; 600/493; 600/494; 600/495; 600/500; 600/504; 600/561; 600/587

(58) Field of Classification Search ................. 434/262, 434/265, 266, 267, 268, 272, 275
See application file for complete search history.

(56) References Cited

U.S. PATENT DOCUMENTS

| | | | |
|---|---|---|---|
| 2,556,043 A | 6/1951 | Roucka | |
| 2,871,584 A | 2/1959 | Poole | |
| 2,995,832 A | 8/1961 | Alderson | |
| 3,784,323 A | 1/1974 | Sausse | |
| 3,868,844 A | 3/1975 | Klein | |
| 3,947,974 A | 4/1976 | Gordon et al. | |
| 3,975,989 A | 8/1976 | Hirmann | |
| RE29,317 E * | 7/1977 | Mosley et al. | ............... 73/866.4 |
| 4,036,216 A | 7/1977 | Ramesy, III | |
| 4,090,431 A | 5/1978 | Hirmann | |
| 4,124,023 A | 11/1978 | Fleischmann et al. | |
| 4,167,070 A | 9/1979 | Orden | |
| 4,189,936 A | 2/1980 | Ellis | |
| 4,248,241 A | 2/1981 | Tacchi | |
| 4,281,647 A | 8/1981 | Antypas | |
| 4,360,345 A | 11/1982 | Hon | |
| 4,464,123 A | 8/1984 | Glover et al. | |
| 4,471,646 A | 9/1984 | Walker | |
| 4,524,777 A | 6/1985 | Kisioka et al. | |
| 4,569,221 A | 2/1986 | Snook | |
| 4,574,812 A | 3/1986 | Arkans | |
| 4,601,665 A | 7/1986 | Messmore | |
| 4,613,327 A | 9/1986 | Tegrarian et al. | |

(Continued)

OTHER PUBLICATIONS

Life Form Deluxe Blood Pressure Simulator with Speaker System, brochure from Global Technologies, date accessed Sep. 22, 2003 www.global-technologies.net/ShopSite/product691.html.

(Continued)

*Primary Examiner* — Nikolai A Gishnock
(74) *Attorney, Agent, or Firm* — Gary J. Morris

(57) ABSTRACT

Many people do not have a physical feeling for what normal and abnormal blood pressure levels mean in relation to the forces exerted on the heart and blood vessels. A blood pressure simulation apparatus provides human subjects a means to physically feel simulated blood pressure levels through tactile feedback. Both normal and abnormal blood pressure cycles are simulated. Interfacing of the apparatus to an electronic blood pressure monitor is provided.

3 Claims, 2 Drawing Sheets

U.S. PATENT DOCUMENTS

| | | |
|---|---|---|
| 4,648,406 A | 3/1987 | Miller |
| 4,658,829 A | 4/1987 | Wallace |
| 4,698,997 A | 10/1987 | Hess et al. |
| 4,773,865 A | 9/1988 | Baldwin |
| 4,841,956 A | 6/1989 | Gardner et al. |
| 4,846,160 A | 7/1989 | Gardner et al. |
| 5,005,826 A | 4/1991 | Merrick |
| 5,016,466 A | 5/1991 | Ness et al. |
| 5,027,641 A | 7/1991 | Costello |
| 5,041,973 A | 8/1991 | Lebron et al. |
| 5,090,417 A | 2/1992 | Mollan et al. |
| 5,181,522 A | 1/1993 | McEwen |
| 5,201,320 A | 4/1993 | Barker |
| 5,215,469 A | 6/1993 | Kohnke et al. |
| 5,267,923 A | 12/1993 | Piaget et al. |
| 5,277,187 A | 1/1994 | Pillsbury |
| 5,374,194 A | 12/1994 | Walcerz et al. |
| 5,391,081 A | 2/1995 | Lampotang et al. |
| 5,391,141 A | 2/1995 | Hamilton |
| 5,396,895 A * | 3/1995 | Takashima et al. ........... 600/500 |
| 5,452,727 A | 9/1995 | Tura et al. |
| 5,464,017 A | 11/1995 | Juang |
| 5,467,772 A | 11/1995 | Souma |
| 5,505,701 A | 4/1996 | Anaya Fernandez de Lomana |
| 5,531,668 A | 7/1996 | Mann et al. |
| 5,553,503 A | 9/1996 | Surdut et al. |
| 5,632,623 A | 5/1997 | Kolff et al. |
| 5,643,138 A | 7/1997 | Huang |
| 5,671,751 A | 9/1997 | Tumey et al. |
| 5,681,043 A | 10/1997 | Winblad et al. |
| 5,722,413 A | 3/1998 | Futcher et al. |
| 5,775,916 A | 7/1998 | Cooper et al. |
| 5,800,359 A | 9/1998 | Medero et al. |
| 5,839,904 A | 11/1998 | Bloom |
| 5,873,731 A | 2/1999 | Pendergast |
| 5,882,207 A | 3/1999 | Lampotang et al. |
| 5,991,654 A | 11/1999 | Tumey et al. |
| 6,007,342 A | 12/1999 | Tj.o slashed.lsen |
| 6,017,307 A | 1/2000 | Raines |
| 6,086,516 A | 7/2000 | Santos |
| 6,149,587 A | 11/2000 | Raines |
| 6,162,188 A | 12/2000 | Barnea |
| 6,168,567 B1 | 1/2001 | Pickering et al. |
| 6,205,871 B1 | 3/2001 | Saloner et al. |
| 6,251,080 B1 | 6/2001 | Henkin et al. |
| 6,283,763 B1 | 9/2001 | Matsuzaki et al. |
| 6,517,354 B1 | 2/2003 | Levy |
| 6,606,907 B1 * | 8/2003 | Rosendahl ................ 73/379.01 |
| 6,669,624 B2 | 12/2003 | Frazier |
| 6,685,481 B2 * | 2/2004 | Chamberlain ................ 434/272 |
| 6,725,728 B1 | 4/2004 | Lee |
| 6,746,470 B2 | 6/2004 | McEwen et al. |
| 6,790,043 B2 | 9/2004 | Aboud |
| 6,834,647 B2 | 12/2004 | Blair et al. |
| 6,918,862 B1 | 7/2005 | Comeau |
| 7,018,327 B1 | 3/2006 | Conti |
| 7,021,940 B2 | 4/2006 | Morris et al. |
| 7,510,398 B1 * | 3/2009 | Thornton ..................... 434/262 |
| 2001/0043847 A1 | 11/2001 | Kramer |
| 2002/0061503 A1 | 5/2002 | Chamberlain |
| 2002/0117173 A1 | 8/2002 | Lynn et al. |
| 2003/0031993 A1 * | 2/2003 | Pugh ............................ 434/262 |
| 2003/0091968 A1 | 5/2003 | Eggert et al. |
| 2003/0139766 A1 | 7/2003 | McEwen et al. |
| 2004/0033477 A1 | 2/2004 | Ramphal et al. |
| 2004/0101814 A1 * | 5/2004 | Morris et al. ................ 434/268 |
| 2005/0113652 A1 | 5/2005 | Stark et al. |
| 2005/0143689 A1 * | 6/2005 | Ramsey, III ............ 604/103.13 |

OTHER PUBLICATIONS

QA-1290 Non-invasive Blood Pressure Analyzer, brochure from Metron, date accessed Sep. 22, 2003. www.metron-biomed.com/product.sub.—sheets/qa1290.sub.—datasheet.htm.

Clinical Dynamics SmartArm NIBP Simulator, brochure from BC Group International, Inc., date accessed Sep. 22, 2003. www.testequipmentandtools.com/acatalog/index.html.

K.K. Deepak, "Blood Pressure Simulated Model: A Teaching Aid", Indian Journal of Physiology and Pharmacology, 1992, 36(3), pp. 155-161.

* cited by examiner

BLOOD PRESSURE SIMULATION APPARATUS WITH TACTILE FEEDBACK

This application is a continuation-in-part of utility patent application Ser. No. 10/677,668 filed Oct. 2, 2003 now U.S. Pat. No. 7,320,599 which is incorporated by reference herein.

BACKGROUND FOR THE INVENTION

1. Field of Invention

This invention relates to a human blood pressure simulation apparatus that provides the user tactile sensations representing the level of pressure within his or her cardio-vascular system during the cardiac cycle of pumping blood throughout the body. Both systolic and diastolic blood pressure levels are simulated at the pulse rate of the simulated cardiac output in one embodiment. The user may compare, by physical feel, his or her blood pressure cycle simulation with that of a normal blood pressure level simulation.

2. Background

Hypertension (high blood pressure) has been called "the silent killer" by health professionals since it damages the human body without being felt by the victim. It is well known that abnormal blood pressure levels can lead to many health related problems and even death. Many millions of people each year have their blood pressure measured, however, only very few actually know what the numbers mean physically with regards to the pressures experienced by their blood vessels and heart. Even less have a sense of what force is exerted by the heart on their blood vessels by normal and abnormal blood pressure levels. To increase the awareness of blood pressure levels in humans, an apparatus has been invented, as described herein, to provide physically sensible feedback in relation to blood pressure levels.

SUMMARY OF THE INVENTION

The embodiments of this invention provide tactile indications to human subjects related to blood pressure forces experienced by cardio-vascular systems under normal and abnormal human blood pressure cycles. The instant invention permits human subjects to physically feel the cyclic pressure experienced by their heart or blood vessels by providing simulation of blood pressure cycles and by including a physical interface by which the subject can sense the force on his or her heart or blood vessels at both the systolic and diastolic portions of the simulated cardiac cycle.

Current medical literature cites normal blood pressure amplitudes for humans to be near 120 mm of Hg for the systolic phase and 80 mm of Hg for the diastolic phase relative to the atmospheric pressure. The units of "mm of Hg" refer to a mercury column (vertical manometer) supported by the blood pressure as measured by blood pressure measuring equipment such as a sphygmomanometer. The height of a vertical column of liquid is an accepted unit of pressure in scientific and medical literature. However, it is anticipated that very few people know what magnitudes of 120 mm of Hg, 80 mm of Hg, etc., actually mean in regard to pressure levels. To further complicate the issue, much of the time, the units on these pressure values are dropped for brevity and are simply reported as unitless numbers as "120/80" as the systolic pressure over the diastolic pressure.

Blood pressure is such a vital health parameter that it is extremely important that people have an accurate physical feeling for what their blood pressure level means relative to normal blood pressure. While customary reporting of systolic pressures over diastolic pressures is one way of relative abstract comparison with normal blood pressure levels, the experience of physically feeling what normal and abnormal blood pressure cycles are like is quite dramatic and has much more lasting impact on the subject. A subject actually feeling his or her abnormal blood pressure level through the apparatus of the instant invention may be more likely to comply with prescribed therapies such as taking medications, engaging in physical exercise, dieting, reduction of body mass, etc. in order to achieve normal blood pressure levels. It is well known that humans cannot feel the level of their arterial blood pressure by pressing their fingers against their veins or arteries near the surface of their skin. Both abnormally high systolic blood pressure levels and abnormally high diastolic blood pressure levels are important to simulate in the apparatus, but not necessarily either or both in every embodiment.

In accordance with the invention, a sense of physical feel as a pressure magnitude comparison is provided rather than an abstract mental comparison of numerical values representing blood pressure levels. A vessel containing pressurized fluid with an interface which permits human subjects to receive tactile sensations of the pressure levels representing those experienced within the subject's blood vessels or heart is provided. It is understood that the use of the term "fluid" herein includes a gas or a liquid or both.

It is understood that sense of touch used herein to sense the magnitudes of the pressures and pressure induced forces within the pressure vessels is more than the mere feeling if a pulsation exists or not. The tactile interface described herein is intended in at least one embodiment to provide a mechanism for the user to sense the difference between the relative magnitudes of normal and abnormal blood pressure levels through the sense of human touching of a pressure vessel.

Various embodiments are described herein to simulate the parameters of the human blood pressure cycle and to convey those parameters to human subjects through the sense of touch. It is understood that no specific descriptions of the embodiments of the inventions are intended to limit the scope of the appended claims.

DETAILED DESCRIPTION OF THE PREFERRED EMBODIMENT

Figure 1:
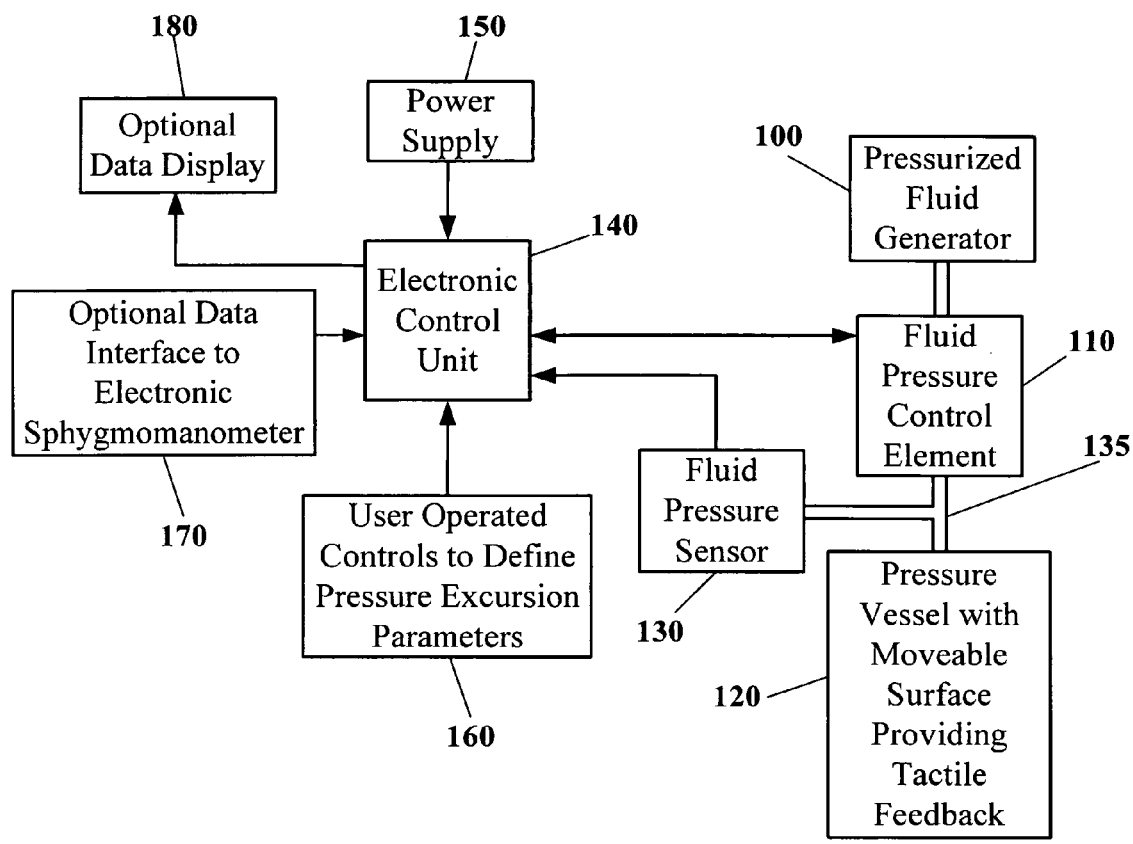
FIG. 1 is a block diagram of the electronic controlled embodiment of the Blood Pressure Simulation Apparatus with Tactile Feedback.

One preferred embodiment of the Blood Pressure Simulation Apparatus with Tactile Feedback is shown in FIG. 1. A pressurized fluid generator 100 provides a fluid above the ambient pressure to serve as the working medium within the pressure vessel with moveable surface 120 providing a tactile interface. The fluid is air in one embodiment. In another embodiment of the invention, the fluid is an incompressible liquid segregated from a gas to provide pressurization. The pressurized fluid generator 100 is an electric powered pump in one embodiment, a compressed fluid storage vessel in another embodiment, and a manually operated pump in yet another embodiment. A fluid pressure control element 110 serves as a pressure regulator to control the pressure level within the pressure vessel with moveable surface 120. In one embodiment, the pressure control element 110 is an electronic controlled solenoid valve (including a proportional solenoid valve option) to control filling and/or venting of the pressure vessel with moveable surface 120 to maintain prescribed pressure levels within the pressure vessel with moveable surface 120. In another embodiment, the pressure control element is an electromechanically actuated or manually actuated pressure regulator to control filling and/or venting of the pressure vessel with moveable surface 120 to maintain prescribed pressure levels within the pressure vessel with moveable surface 120. An electronic fluid pressure sensor 130 senses the pressure level within the pressure vessel with moveable surface 120 and provides electronic pressure data feedback to the electronic control unit 140 through an electronic interface in the electronic control unit 140 such as an analog to digital converter circuit within or connected to the electronic control unit 140. The electronic fluid pressure sensor 130 has sufficient instrumentation dynamic response to accurately measure pressure oscillations on the order of a human pulse rate which is typically between 50 and 120 cycles per minute. Some non-limiting examples of the electronic fluid pressure sensor 130 include strain-gauge pressure transducers, piezoelectric pressure transducers, piezo-resistive pressure transducers, capacitance type pressure sensors, etc. The electronic fluid pressure sensor 130 does not comprise a liquid (such as mercury) filled manometer column if the blood pressure cycles being simulated are simulated at a human cardiac pulse rate since such manometers have insufficient dynamic response. A manifold 135 comprising hollow conduits, pneumatically connects the fluid pressure control element 110, the pressure vessel with moveable surface 120, and the electronic fluid pressure sensor 130. A power supply 150 provides electrical energy to the electronic control unit 140 and other components. User-operated controls to define pressure excursion parameters 160 are electrically connected to the electronic control unit 140 to provide the user a method to set the simulated diastolic blood pressure and systolic blood pressure levels within the pressure vessel with moveable surface 120 and to set the simulated cardiac pulse rate where, in one embodiment, these controls include, without limitation, electronic switches, momentary switches, or variable resistors. In one embodiment, a toggle switch within the user-operated controls 160 is used to select between simulating normal blood pressure levels and the user's blood pressure levels, which may be abnormal blood pressure levels, within the pressure vessel with moveable surface 120.

In one embodiment, an optional data interface to an electronic sphygmomanometer 170 such as an RS-232 serial data interface, USB interface, or other known electronic data interface is used to transfer blood pressure data from an electronic sphygmomanometer which acquires blood pressure data from a human subject as input settings to the electronic control unit 140 to maintain the simulated diastolic and systolic blood pressure levels and the periodicity of the simulated cardiac cycle within the pressure vessel with moveable surface 120 equivalent to the respective pressure levels and cardiac cycle periodicity as measured from the human subject by the electronic sphygmomanometer (not shown). An optional data display 180 is used in one embodiment to indicate to the user the simulated diastolic and systolic blood pressure levels.

The electronic control unit 140 is the master controller unit of the apparatus interfacing with the electronic fluid pressure sensor 130, the fluid pressure control element 110, the user operated controls 160, an optional data interface to the electronic sphygmomanometer 170, and an optional data display 180. The electronic control unit 140 electronically maintains the periodicity and pressure levels within the pressure vessel with moveable surface 120 for the simulated blood pressure cycles. In one embodiment, the electronic control unit 140 circuitry includes a programmable microprocessor having firmware or software to control internal logic functions and input and output ports which interface with the electronic fluid pressure sensor 130, the fluid pressure control element 110, and the user operated controls 160 and other hardware. In another embodiment, the electronic control unit 140 includes an application specific integrated circuit (ASIC). In one embodiment, the pressurized fluid generator 100 conveys fluid to the fluid pressure control element 110 which conveys the pressurized fluid to pressure vessel with moveable surface 120 thereby increasing the pressure inside the pressure vessel with moveable surface 120 until the pressure level as measured by the electronic fluid pressure sensor 130 reaches the systolic pressure as input into the electronic control unit 140 by the user-operated controls 160 or by the optional data interface to an electronic sphygmomanometer 170. The electronic control unit 140 then signals the fluid pressure control element 110 to decrease the pressure within the pressure vessel with moveable interface 120 by venting fluid from the pressure vessel with moveable surface 120 until the desired diastolic pressure is reached as measured by the electronic fluid pressure sensor 130. The electronic control unit 140 signals the fluid pressure control element 110 to begin increasing the pressure within the pressure vessel with moveable surface 120 towards the systolic pressure level after a suitable delay time has elapsed to maintain the desired periodicity of the blood pressure cycle being simulated. The cycle repeats to simulate the periodic nature of human cardiac cycles.

Figure 2:
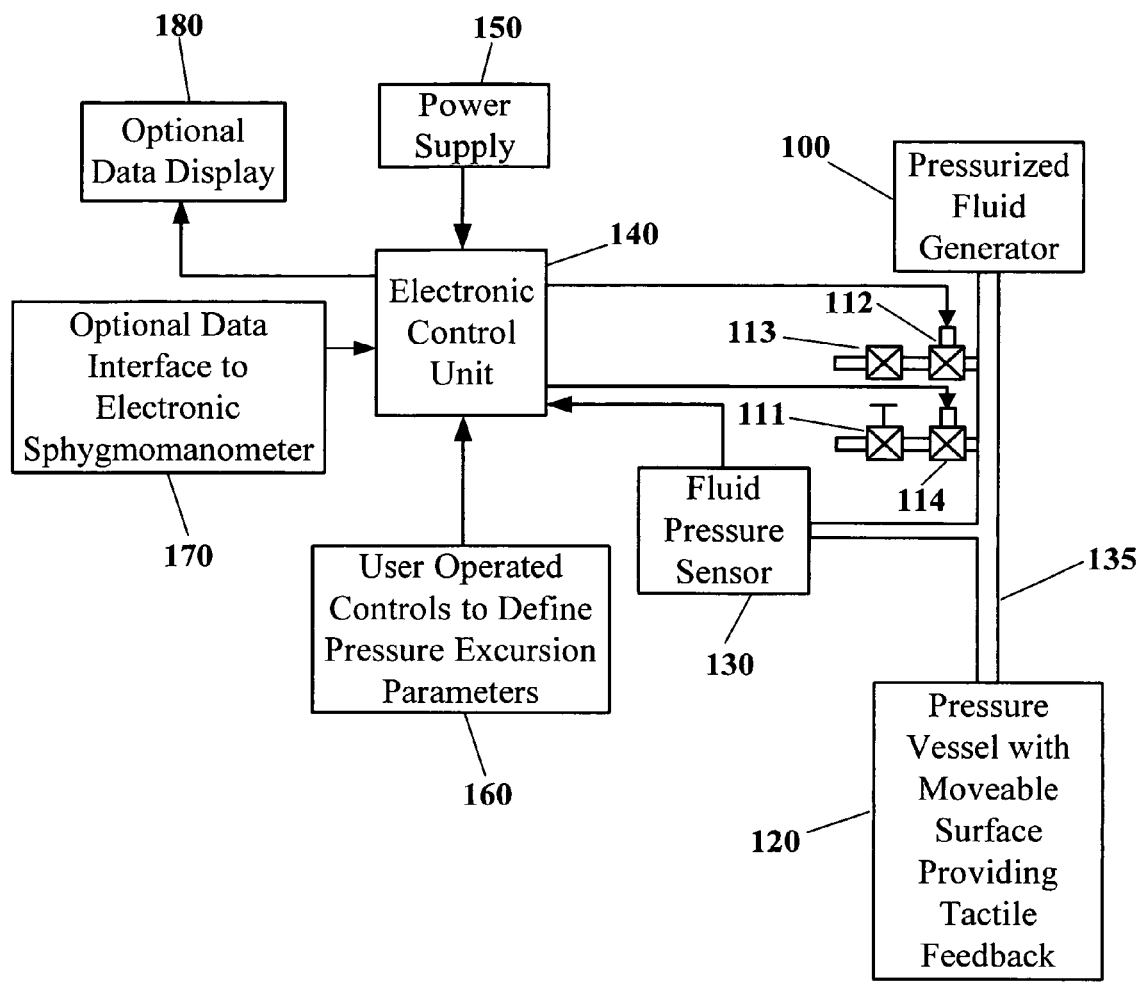
FIG. 2 is a block diagram of the electronic controlled embodiment of the Blood Pressure Simulation Apparatus with Tactile Feedback with bleed valves to control diastolic pressures.

In one embodiment as illustrated in FIG. 2, the diastolic pressures of the both abnormal and normal simulated blood pressure modes are controlled by a first bleed valve 111 and second bleed valve 113, respectively, to maintain the desired diastolic pressure within the pressure vessel with moveable interface 120 such that the fluid mass flow rate from the pressurized fluid generator 100 into the pressure vessel with moveable surface 120 is offset by the fluid mass flow rate out of the pressure vessel with moveable surface 120 through the first bleed valve 111 or the second bleed valve 113, thereby maintaining fluid flow equilibrium established diastolic pressure for fractions of the simulated blood pressure cycle. In this case, the first bleed valve 111 to control abnormal simulated diastolic blood pressure is adjusted by the user to select the desired diastolic blood pressure to be simulated in the pressure vessel 120 during the abnormal blood pressure mode of the apparatus. The second bleed valve 113 controls the normal diastolic pressure (usually 80 mm of Hg) simulated by the apparatus within the pressure vessel 120 in the normal blood pressure mode of the apparatus. The second bleed valve 113 is set by the manufacturer to provide a fixed geometry flow passage and is not user-adjustable such as but not limited to a fixed position needle valve. During the diastolic pressure data input phase by the user in this embodiment, the electronic control unit 140 holds open a solenoid valve 114 pneumatically connected to the first bleed valve 111 while the user adjusts the first bleed valve 111 until the desired diastolic pressure within the pressure vessel with moveable surface 120 is reached as measured by the electronic fluid pressure sensor 130 with the pressure level shown on the data display 180. In this embodiment, the pressurized fluid from the pressurized fluid generator 100 flows into the pressure vessel with moveable surface 120 though the manifold 135 which is comprised of bi-directional flow hollow conduits. When the pressure inside of the pressure vessel with moveable surface 120 reaches the desired systolic pressure (as previously entered by the user or through the interface to an electronic sphygmomanometer 170) as measured by the electronic fluid pressure sensor 130, the electronic control unit 140 opens the solenoid valve 114 to vent fluid through the first bleed valve 111 whereby the user pre-set simulated diastolic pressure level is experienced within the pressure vessel with moveable surface 120. After a period of time has elapsed as controlled by the electronic control unit 140 to maintain the desired simulated pulse rate, the electronic control unit 140 closes the solenoid 114 to repeat the cycle. When the toggle switch in the user-operated controls 160 is moved to the normal blood pressure mode, the electronic control unit 140 assures that solenoids 112 and 114 are closed so that the pressurized fluid flows into the pressure vessel with moveable surface 120 until the normal systolic pressure (typically 120 mmHg) is reached as measured by the electronic fluid pressure sensor 130. The electronic control unit 140 then opens solenoid 112 to vent fluid through the second bleed valve 113 whereby the normal simulated diastolic pressure level (typically 80 mmHg) is experienced within the pressure vessel with moveable surface 120. After a period of time has elapsed as controlled by the electronic control unit 140 to maintain a normal simulated pulse rate (typically 72 cycles per minute), the electronic control unit 140 closes the solenoid 112 to repeat the cycle. When the toggle switch in the user-operated controls 160 is moved to the abnormal blood pressure mode, the electronic control unit 140 assures that the solenoids 112 and 114 are closed and the simulated systolic and diastolic pressure levels as previously entered by the user are supplied to the pressure vessel with moveable surface 120 by cyclic action of solenoid 114 as described above.

The pressure vessel with moveable surface 120 is the tactile interface with human subjects to physically communicate the pressure induced forces acting on blood vessels or heart subjected to blood pressure levels. The pressure level inside the pressure vessel with moveable surface 120 is communicated to a human subject through touching or gripping of at least one moveable surface. In one embodiment, the pressure vessel with moveable surface 120 is comprised of a rubber or elastomeric hollow bulb (similar to a manual inflation bulb of a sphygmomanometer but without the check-valves normally contained in a manual inflation bulb) designed to be gripped in one hand while a simulated blood pressure is applied to the inside of the bulb. In this embodiment, the user feels the force experienced by the walls of blood vessels or the heart under pressure and gets a true sense of the containment force required to maintain the blood vessels intact or the force the heart exerts to pump blood. In one embodiment, a small volume bulb can communicate the force exerted on the blood vessels while a larger volume bulb can communicate the force exerted by the heart. The forces due to abnormal blood pressure levels can be compared relative to forces due to normal blood pressure levels by adjusting the user-operated controls 160, such as the activation of a toggle switch to toggle between normal and abnormal blood pressure levels. In at least one embodiment, the pressurized fluid is conveyed to the pressure vessel with at least one moveable surface 120 through a conduit having a smaller diameter than the pressure vessel with at least one moveable surface 120 such that force amplification occurs within the pressure vessel with moveable surface 120 compared to within the conduit.

In another embodiment, the rubber or elastomeric hollow bulb has a rigid, incompressible solid member positioned inside so that the human subject can compress the bulb by hand so at least some portion of the inner bulb surface remains in contact with the solid member, thus providing consistent feel and reduced tendency for the subject to randomly squeeze the bulb during blood pressure simulation. The incompressible member may further include at least one electrical contact in electrical communication to the electronic control unit 140 to sense when the bulb has been squeezed to contact the incompressible member. In another embodiment, the pressure vessel with moveable surface 120 is comprised of a piston-cylinder apparatus with the pressurized fluid conveyed to one end of the cylinder joined to manifold 135 whereby a human subject can feel the force on the piston on the other end of the cylinder induced by the simulated blood pressure levels. In yet another embodiment, an inflatable cuff serves as the tactile interface whereby a human body appendage such as a finger, hand, arm, or leg is surrounded by the cuff. All embodiments of the invention provide the user of the apparatus a physical feeling for the relative magnitudes of simulated blood pressures or pressure induced forces within the pressure vessel with moveable surface 120. The apparatus may simulate normal as well as abnormal human blood pressure levels.

In another preferred embodiment, the apparatus of FIG. 1 is integrally combined with an electronic sphygmomanometer to comprise a single unit capable of reading blood pressure levels and simulating the diastolic and systolic blood pressure levels in a pressure vessel so the human subject can physically feel the pressure induced forces experienced by the subject's own blood vessels.

It is understood that the concepts of the elastomeric hollow bulb described in this specification and appended claims are intended to be broad in scope and include all vessels having at least some non-fixed surface portion that can be used by humans to sense, through touch, pressure levels within such vessels. One function of the vessels with at least some non-fixed surface portion is to provide significant force amplification within the vessel compared to the force exerted on the walls of the relatively small diameter conduits comprising the manifold 135 connecting the system components. The functions of elastomeric hollow bulbs described within this specification and appended claims may also be replaced with a bellows apparatus without loss of intended function of the invention.

It is understood that the pressure vessel with moveable surface 120 in more than one embodiment is not buried within the tissues of a simulated human body nor contained within a simulated human body part such as but not limited to a simulated arm, leg, neck, or thorax, but rather is readily accessible to be directly touched or gripped by a user so the user can accurately sense the relative magnitudes of the pressure and force oscillations inside of the pressure vessel 120 without attenuation due to surrounding materials simulating the human body tissue.

The various preferred embodiments described above are merely descriptive of the present invention and are in no way intended to limit the scope of the invention. Modifications of the present invention will become obvious to those skilled in the art in light of the detailed description above, and such modifications are intended to fall within the scope of the appended claims.

I claim:

1. An apparatus for simulating human blood pressure and providing tactile feedback comprising:
   an elastomeric hollow bulb;
   a pressurized fluid generator connected by a flow conduit to the bulb whereby pressurized fluid from the pressurized fluid generator flows into the bulb;
   the diameter of the flow conduit is smaller than the bulb diameter thereby creating force amplification within the bulb compared to the conduit;
   an element to control fluid pressure level within the bulb;
   at least one pressure level within the bulb is equivalent to an abnormally high, human systolic blood pressure; and
   the bulb comprises at least one moveable boundary whereby a human can sense by touch the magnitude of the pressure level within the bulb.

2. The apparatus in claim 1 further comprising at least one pressure level within the bulb equivalent to a normal human systolic blood pressure level.

3. The apparatus in claim 2 further comprising at least one pressure level within the bulb equivalent to an abnormally high, human diastolic blood pressure level.

* * * * *